(12) United States Patent
Krakowski et al.

(10) Patent No.: US 10,507,926 B2
(45) Date of Patent: Dec. 17, 2019

(54) CONVEYING DEVICE AND AIRCRAFT SYSTEM WITH A CONVEYING DEVICE OF SUCH A TYPE

(71) Applicant: Airbus Operations GmbH, Hamburg (DE)

(72) Inventors: Dariusz Krakowski, Hamburg (DE); Stephan Risse, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 94 days.

(21) Appl. No.: 14/990,803

(22) Filed: Jan. 8, 2016

(65) Prior Publication Data

US 2016/0200440 A1    Jul. 14, 2016

(30) Foreign Application Priority Data

Jan. 8, 2015  (DE) ................ 10 2015 200 110

(51) Int. Cl.
*B64D 13/06* (2006.01)
*F04D 13/06* (2006.01)

(52) U.S. Cl.
CPC ......... *B64D 13/06* (2013.01); *F04D 13/06* (2013.01); *B64D 2013/0644* (2013.01)

(58) Field of Classification Search
CPC ........ H05K 7/20; F04D 25/06; F04D 29/644; F04D 25/0666; F04D 25/0606; F04B 17/00
USPC ....... 454/76, 71, 78, 77, 83, 84, 87; 361/695
See application file for complete search history.

(56) References Cited

U.S. PATENT DOCUMENTS

| | | | | |
|---|---|---|---|---|
| 5,763,969 | A * | 6/1998 | Metheny | H02K 9/14 310/52 |
| 7,558,061 | B2 * | 7/2009 | Franz | F04D 29/646 361/694 |
| 7,923,875 | B2 | 4/2011 | Henry et al. | |
| 2006/0232931 | A1 | 10/2006 | Obermaier | |
| 2011/0171896 | A1 * | 7/2011 | Brunnberg | B64D 13/00 454/76 |

FOREIGN PATENT DOCUMENTS

| | | |
|---|---|---|
| DE | 102008035122 | 2/2010 |
| DE | 102012106529 | 1/2014 |
| DE | 202010018108 | 5/2014 |
| EP | 1511156 | 3/2005 |
| JP | 2009044193 | 2/2009 |

OTHER PUBLICATIONS

Merriam-Webster, Definition of "seal", Accessed Mar. 18, 2019, PDF attached, 2019.*
German Search Report, dated Sep. 9, 2015, Priority Application.

* cited by examiner

*Primary Examiner* — Gregory L Huson
*Assistant Examiner* — Elizabeth M. May
(74) *Attorney, Agent, or Firm* — Greer, Burns & Crain, Ltd.

(57) ABSTRACT

A conveying device for conveying a fluid stream comprising a mechanical unit, including a movable conveying element, and an electrical unit comprising a housing as well as electronic elements arranged in the housing. The mechanical unit and the electrical unit are detachably connected to one another.

6 Claims, 2 Drawing Sheets

CONVEYING DEVICE AND AIRCRAFT SYSTEM WITH A CONVEYING DEVICE OF SUCH A TYPE

CROSS-REFERENCES TO RELATED APPLICATIONS

This application claims the benefit of German patent application No. 10 2015 200 110.5 filed on Jan. 8, 2015, the entire disclosures of which are incorporated herein by way of reference.

BACKGROUND OF THE INVENTION

The present invention relates to a conveying device for conveying a fluid stream and also to a process for maintaining a conveying device of such a type. The invention further relates to an aircraft system—designed, in particular, in the form of an aircraft cooling system or aircraft air-conditioning unit—that is equipped with a conveying device of such a type.

A plurality of conveying devices for transporting a medium are integrated within a modern passenger aircraft. In an aircraft air-conditioning unit, use is made of conveying devices—designed, for example, in the form of speed-controlled fans—for conveying recirculation air out of an air-conditioned region of the aircraft into a mixer of the air-conditioning unit. A recirculation system of an aircraft air-conditioning unit that comprises a plurality of fans is described in DE 10 2008 035 122 B4 and US 2011/171896 A1, for example. Conventionally, an aircraft air-conditioning unit further includes fans which provide conditioned air for a passenger cabin, for a freight compartment or for a cockpit at the site of their use. Further conveying devices are employed in various cooling and ventilating systems for the purpose of conveying a fluid stream.

SUMMARY OF THE INVENTION

The invention is directed towards an object of providing a compact, easy-to-maintain conveying device for conveying a fluid stream, said device being suitable, in particular, for use on board an aircraft. The invention is further directed towards an object of specifying a process for maintaining a conveying device of such a type, and also towards an aircraft system equipped with a conveying device of such a type.

A conveying device for conveying a fluid stream includes a mechanical unit which includes a movable conveying element. The conveying device may be designed, for example, in the form of a fan, in particular a speed-controlled fan. The mechanical unit of the conveying device preferably comprises all the components of the conveying device that serve to direct and move the fluid stream. The movable conveying element of the mechanical unit may, for example, be configured in the form of a rotor. A drive element, assigned to the mechanical unit, for driving the movable conveying element is preferably designed in the form of an electric motor.

The conveying device further includes an electrical unit which comprises a housing as well as electronic elements arranged in the housing. The electronic elements arranged in the housing of the electrical unit may comprise, for example, power-supply components, power-electronics components and also components for regulating and driving the electric motor. The power electronics may comprise an input stage with an autotransformer, with a rectifier and with a filter for a.c./d.c. conversion of the input voltage, a power stage with a d.c.-voltage intermediate circuit with smoothing capacitor and inverter for d.c./a.c. conversion for the purpose of generating a variable-speed voltage system, a driver stage for generating signals for pulse-width modulation and for driving power semiconductors, and a logic circuit for controlling the drive element for propelling the movable conveying element and also for fault-monitoring and temperature-monitoring.

In the conveying device, the mechanical unit and the electrical unit are detachably connected to one another. By the term 'detachably connected' here, it will be understood that the mechanical unit and the electrical unit of the conveying unit can be non-destructively separated from one another. In the case of a failure of the conveying device by reason of a fault that relates either exclusively to the mechanical unit or exclusively to the electrical unit, merely the faulty unit of the conveying device can then be disassembled and replaced, whereas the other unit can remain in situ at its installation site, and consequently interfaces of this unit with surrounding components can also remain unchanged. This is advantageous, in particular, in installation situations in which one unit of the conveying device can be disassembled without difficulty, whereas for the de-installation of the other unit or of the conveying device overall a relatively large disassembly space has to be created.

For example, in the case of a failure of an electronic component the design of the conveying device makes it possible for merely the electrical unit of the conveying device to be de-installed, whereas the mechanical unit can remain at its installation site. For many cases of a fault in the conveying device, the maintenance work for eliminating these faults can consequently be distinctly simplified. Furthermore, the detachable connection of the mechanical unit and the electrical unit has no influence on the dimensions of the conveying device, so that a conveying device in which the mechanical unit and the electrical unit are detachably connected to one another can be made just as compact as a conveying device in which the mechanical unit and the electrical unit are inseparably connected to one another.

The mechanical unit and the electrical unit of the conveying device are preferably connected to one another by a non-destructively detachable fastening device. The non-destructively detachable fastening device may comprise screws or a detent device, for example. What is significant is merely that after the separation from the electrical unit the mechanical unit can be connected to a substitute electrical unit, or conversely.

The mechanical unit may include an interface element which is adapted to interact with a complementary interface element of the electrical unit, in order to bring about an electrical coupling of the mechanical unit to the electrical unit. Via the interface element, an electric motor arranged in the mechanical unit of the conveying unit can, for example, be connected to power-supply components provided in the electrical unit of the conveying device. For example, appropriate three-phase terminals may have been provided on the interface element of the mechanical unit and on the complementary interface element of the electrical unit, in order to guarantee the supply of the electric motor with current. Furthermore, the interface element may be adapted to connect sensors arranged in the mechanical unit of the conveying device—such as, for example, temperature sensors or sensors for measuring a volumetric rate of flow of the fluid stream being conveyed by the conveying device—to a control-logic circuit and/or fault-monitoring and temperature-monitoring logic circuit provided in the electrical unit.

For example, the interface element of the mechanical unit may comprise at least one of a contact field, a contact pin, a contact-pin socket and a spring-loaded contact element, which is adapted to interact with a complementary contact field, a complementary contact-pin socket, a complementary contact pin and a complementary spring-loaded contact element, respectively, of the electrical unit, in order to bring about an electrical coupling of the mechanical unit to the electrical unit. Contact fields or contact pins interacting with corresponding contact-pin sockets present themselves, for example, for the purpose of establishing a power-supply connection, for example for an electric motor assigned to the mechanical unit.

Spring-loaded contact elements are particularly suitable to couple sensors assigned to the mechanical unit to logic components arranged in the housing of the electrical unit. For this purpose, merely the contact element assigned to the mechanical unit or merely the contact element assigned to the electrical unit may be spring-loaded and may interact with a complementary contact element designed, for example, in the form of a flat contact field. What is significant is merely that the spring preload acting on the spring-loaded contact element pushes the spring-loaded contact element against the complementary contact element in such a manner that a secure and reliable contact connection between the two contact elements is ensured. If desired, however, both the contact element assigned to the mechanical unit and the contact element assigned to the electrical unit may be of spring-loaded construction.

In a preferred embodiment of the conveying device, the housing of the electrical unit is designed to be open on its side facing towards the mechanical unit. The conveying device can then be made particularly lightweight without impairing the protective function of the housing, since the electronic components arranged in the housing are protected from environmental influences, on the one hand by the housing and on the other hand by the mechanical unit.

The housing of the electrical unit may be connected to the mechanical unit in sealing manner. For this purpose, sealing elements corresponding with the mechanical unit may be provided in a contact region of the housing. A sealing connection of the housing to the mechanical unit guarantees a particularly secure protection of the electronic components arranged in the housing from environmental influences.

The electrical unit of the conveying device preferably includes cooling fins which are arranged in such a way that they project into a fluid stream generated by the movable conveying element of the mechanical unit in operation of the conveying device. Via the cooling fins, cooling energy is supplied to the electronic elements of the electrical unit, so that a separate cooling of these components can be dispensed with. Some power-electronics components provided in the electrical unit, in particular an autotransformer of an input stage, may possibly have special cooling requirements.

The cooling fins of the electrical unit preferably project, through a recess formed in a housing of the mechanical unit, into the fluid stream generated by the movable conveying element of the mechanical unit in operation of the conveying device in such a manner that the cooling fins, are removable from, i.e., can be taken out of the recess when the electrical unit is being detached from the mechanical unit. In other words, the cooling fins of the electrical unit are shaped and arranged in such a manner that they do not impede the separation of the electrical unit from the mechanical unit of the conveying device.

In the course of a process for maintaining a conveying device, described above, for conveying a fluid stream, the electrical unit and the mechanical unit of the conveying device are detached from one another. In particular, the electrical unit is detached from the mechanical unit and removed from its installation position, whereas the mechanical unit remains at its installation site.

A conveying device described above for conveying a fluid stream is particularly suitable for use in an aircraft system. The aircraft system may, for example, have been designed in the form of an aircraft air-conditioning unit or aircraft cooling system.

BRIEF DESCRIPTION OF THE DRAWINGS

A preferred embodiment of the invention will now be described in more detail on the basis of the appended schematic drawings, in which.

DETAILED DESCRIPTION OF THE PREFERRED EMBODIMENTS

Figure 1:
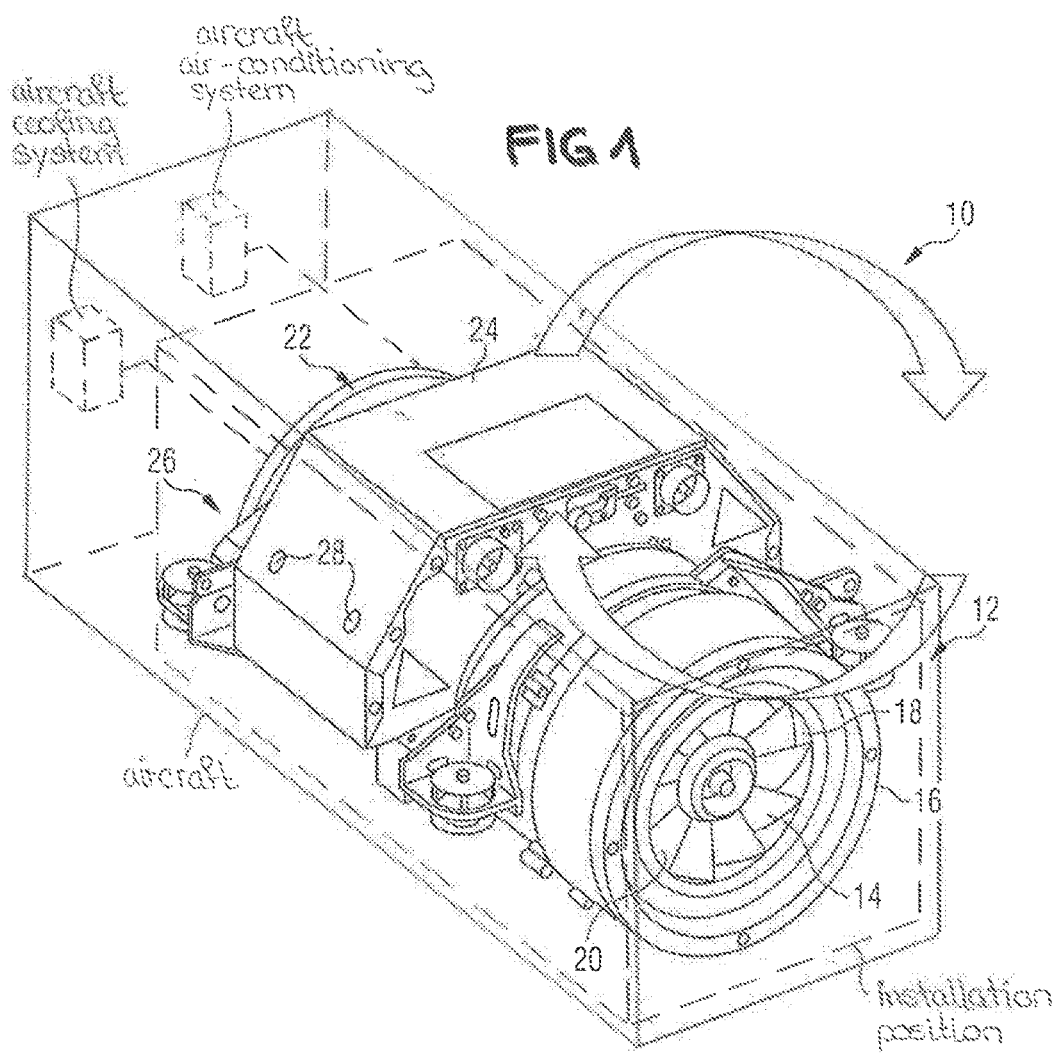
FIG. 1 shows a conveying device for conveying a fluid stream.

FIG. 1 shows a conveying device 10 for conveying a fluid stream. In the embodiment shown, the conveying device 10 is designed in the form of a fan which, for example, may find application in an aircraft air-conditioning unit by way of recirculation fan for conveying recirculation air out of an aircraft cabin into a mixing chamber of the aircraft air-conditioning unit. The conveying device 10 includes a mechanical unit 12 with a movable conveying element 14 designed in the form of a rotor. The movable conveying element 14 is received in a housing 16 of the mechanical unit so as to be capable of being rotated about an axis, and is driven by an electric motor which is not illustrated in FIG. 1. Sensors 18, 20 serve for measuring the temperature as well as the volumetric rate of flow of a fluid being conveyed by the conveying device 10, i.e., in the embodiment shown, the stream of air being conveyed by the conveying device 10.

The conveying device 10 further includes an electrical unit 22 which comprises a housing 24 as well as electronic elements arranged in the housing. The electronic elements received in the housing 24 of the electrical unit 12 comprise, for example, power-supply components, power-electronics components and also components for regulating and driving the electric motor assigned to the mechanical unit 12 and serving to propel the movable conveying element 14. The power-electronics components of the electrical unit 22 comprise, in particular, an input stage with an autotransformer, with a rectifier and also with a filter for a.c.-voltage/d.c.-voltage conversion of the input voltage, a power stage with a d.c.-voltage intermediate circuit with smoothing capacitor and with an inverter for d.c.-voltage/a.c.-voltage conversion for the purpose of generating a variable-speed voltage system, a driver stage for generating signals for pulse-width modulation and for driving power semiconductors, and a logic circuit for control and also for fault-monitoring and temperature-monitoring.

The mechanical unit 12 and the electrical unit 22 of the conveying device 10 are detachably connected to one another. In particular, the mechanical unit 12 and the electrical unit 22 are detachably connected to one another by a non-destructively detachable fastening device 26 which comprises a plurality of screws 28. Each screw 28 penetrates a bore formed in the housing 24 of the electrical unit 12 and engages with a thread which is formed in the housing 16 of the mechanical unit 12. As a result of loosening of the screws 28, the mechanical unit 12 and the electrical unit 22 of the conveying device 10 can be separated from one another.

For example, in the case of a failure of the conveying device 10 due to a fault of a component of the electrical unit 22 the electrical unit 22 can be taken off of the mechanical unit 12 and de-installed from its installation site, whereas the mechanical unit 12 can remain in situ at its installation site. Maintenance work on the conveying device 10 can be distinctly simplified in this way, since interfaces of the mechanical unit 12 with surrounding components are not affected. Maintenance work on the conveying device 10, in the course of which the electrical unit 22 is detached from the mechanical unit 12, is particularly advantageous when the de-installation of the electrical unit 22 is comparatively easy to effect, whereas additional disassembly space would have to be created for the disassembly of the mechanical unit 12.

The housing 24 of the electrical unit 22 is designed to be open on its side facing towards the mechanical unit 12, and can as a result be made particularly lightweight. Furthermore, the housing 24 of the electrical unit 22 is connected to the mechanical unit 12 in sealing manner, so that the penetration of moisture and/or dirt into the housing 24 of the electrical unit 22 is securely prevented. In order to enable a simple connection and separation of the mechanical unit 12 and the electrical unit 22, the mechanical unit 12 includes an interface element 30 illustrated in FIG. 2 and FIG. 3. The interface element 30 of the mechanical unit 12 is adapted to interact with a complementary interface element 32 of the electrical unit 22, in order to bring about an electrical coupling of the mechanical unit 12 to the electrical unit 22.

Figure 2:
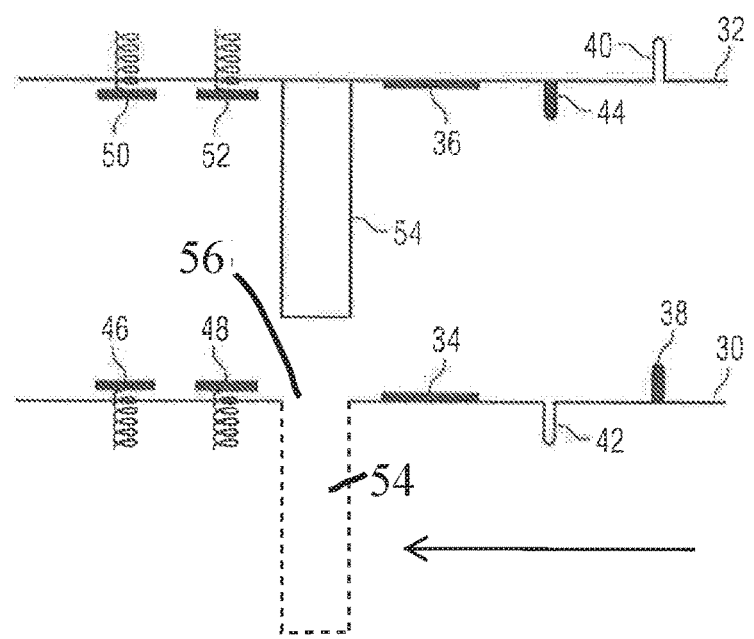
FIG. 2 shows an interface element of a mechanical unit of the conveying device according to FIG. 1 and also a complementary interface element of the electrical unit of the conveying device.
Figure 3:
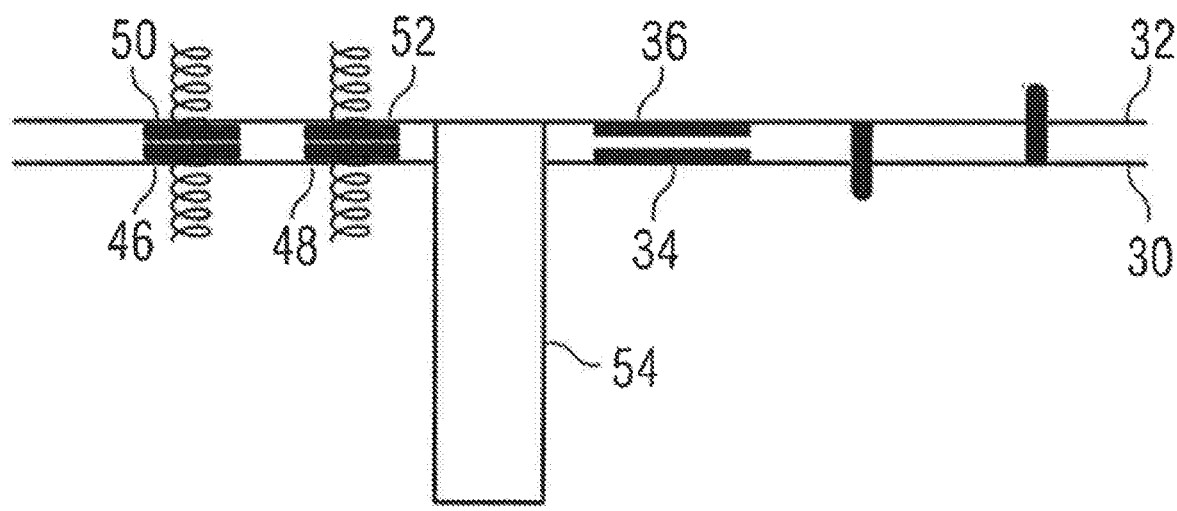
FIG. 3 shows the interface element of the mechanical unit of FIG. 2 and the interface element of the electrical unit of FIG. 2 interacting.

As can be discerned in FIG. 2 and FIG. 3, the interface element 30 of the mechanical unit 12 includes a contact field 34 which is adapted to interact with a complementary contact field 36 of the interface element 32 of the electrical unit 22. A contact pin 38 provided on interface element 30 is provided to interact with a complementary contact-pin socket 40 which is provided on interface element 32. Finally, on interface element 30 a contact-pin socket 42 is provided which is provided to receive a contact pin 44 provided on interface element 32. Through the interaction of the contact fields 34, 36 and/or through the interaction of the contact pins 38, 44 with the contact-pin sockets 40, 42, the electric motor assigned to the mechanical unit 12 can, for example, be supplied with current and also coupled to the electronic control components of the electrical unit 22.

Spring-loaded contact elements 46, 48 provided on interface element 30 are provided for interacting with complementary spring-loaded contact elements 50, 52 provided on interface element 32, and serve for coupling the sensors 18, 20 to the logic components received in the housing 24 of the electrical unit 22. If desired, merely the contact elements 46, 48, 50, 52 formed on one interface element 30, 32 may be constructed in the form of spring-loaded contact elements, and the corresponding complementary contact elements may be designed in the form of fixed contact fields.

Finally, the interface element 32 of the electrical unit 22 includes cooling fins 54 which, for example, may be fastened to the housing 24 of the electrical unit 22. In operation of the conveying device 10, the cooling fins 54 project into a fluid stream (shown as an arrow in FIG. 2) generated by the movable conveying element 14 of the mechanical unit 12, and in this way provide for a sufficient cooling of the electronic elements of the electrical unit 22. In particular, the cooling fins 54 of the electrical unit 22 project, through a recess 56 formed in the housing 16 of the mechanical unit 12, into the fluid stream (arrow in FIG. 2) generated by the conveying element 14 in operation of the conveying device 10 in such a manner that the cooling fins 54 can be removed from, i.e., taken out of the recess 56 when the electrical unit 22 is being detached from the mechanical unit 12, and consequently do not impede the disassembly of the electrical unit 22 from the mechanical unit 12.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A conveying device for conveying a fluid stream, comprising:
    a mechanical unit including a movable conveying element, the mechanical unit having an installation position, and
    an electrical unit comprising a housing as well as electronic elements arranged in the housing,
    wherein the mechanical unit and the electrical unit are detachably connected to one another,
    wherein the mechanical unit remains at the installation position when the electrical unit including its housing is detached from the mechanical unit, and
    wherein the mechanical unit includes an interface element configured to interact with a complementary interface element of the electrical unit, in order to bring about an electrical coupling via the interface elements of the mechanical unit to the electrical unit;
    wherein the electrical unit includes cooling fins projecting into a fluid stream generated by the movable conveying element of the mechanical unit in operation of the conveying device;
    wherein the cooling fins of the electrical unit project, through a recess formed in a housing of the mechanical unit, into the fluid stream within the mechanical unit generated by the movable conveying element of the mechanical unit in operation of the conveying device, such that the cooling fins are removed from the recess and the fluid stream when the electrical unit is detached from the mechanical unit,
    wherein the housing of the electrical unit is connected to the mechanical unit in a sealed manner so as to prevent moisture, dirt, or both from penetrating the electrical unit; and,
    wherein the complementary interface element of the electrical unit and the interface element of the mechanical unit are arranged such that an electrical connection is made by attaching the housing of the electrical unit to the mechanical unit, and the electrical connection is broken by detaching the housing of the electrical unit from the mechanical unit.

2. The conveying device according to claim 1, wherein the mechanical unit and the electrical unit are detachably connected to one another by a non-destructively detachable fastening device.

3. The conveying device according to claim 1, wherein the interface element of the mechanical unit comprises at least one of a contact field, a contact pin, a contact-pin socket and a spring-loaded contact element, configured to interact with a complementary contact field, a complementary contact-pin socket, a complementary contact pin and a complementary spring-loaded contact element, respectively, of the electrical unit, to bring about an electrical coupling of the mechanical unit to the electrical unit.

4. The conveying device of claim 1, wherein the complementary interface element of the electrical unit is arranged on the housing of the electrical unit and,
   wherein the mechanical unit includes a housing and wherein the interface element of the mechanical unit is arranged on the housing of the mechanical unit.

5. A process for maintaining a conveying device for conveying a fluid stream, the conveying device comprising:
   a mechanical unit including a movable conveying element, the mechanical unit having an installation position, and
   an electrical unit comprising a housing as well as electronic elements arranged in the housing,
   wherein the mechanical unit and the electrical unit are detachably connected to one another, and
   wherein the mechanical unit includes an interface element configured to interact with a complementary interface element of the electrical unit, in order to bring about an electrical coupling via the interface elements of the mechanical unit to the electrical unit
   the process comprising the step of:
   detaching the electrical unit including its housing and the mechanical unit from one another,
   wherein the mechanical unit remains at the installation position when the electrical unit including its housing is detached;
   wherein the electrical unit includes cooling fins projecting into a fluid stream—within—the mechanical unit generated by the movable conveying element of the mechanical unit in operation of the conveying device;
   wherein the cooling fins of the electrical unit project, through a recess formed in a housing of the mechanical unit, into the fluid stream generated by the movable conveying element of the mechanical unit in operation of the conveying device, such that the cooling fins are removed from the recess and the fluid stream when the electrical unit is detached from the mechanical unit, and,
   wherein the housing of the electrical unit is connected to the mechanical unit in a sealed manner so as to prevent moisture, dirt, or both from penetrating the electrical unit; and,
   wherein the complementary interface element of the electrical unit and the interface element of the mechanical unit are arranged such that an electrical connection is made by attaching the housing of the electrical unit to the mechanical unit, and the electrical connection is broken by detaching the housing of the electrical unit from the mechanical unit.

6. An aircraft system, comprising:
   an aircraft air-conditioning unit or aircraft cooling system;
   a conveying device coupled to the aircraft air-conditioning unit or aircraft cooling system for conveying a fluid stream, comprising:
   a mechanical unit including a movable conveying element, the mechanical unit having an installation position, and
   an electrical unit comprising a housing as well as electronic elements arranged in the housing,
   wherein the mechanical unit and the electrical unit including its housing are detachably connected to one another,
   wherein the mechanical unit remains at the installation position when the electrical unit including its housing is detached, and
   wherein the mechanical unit includes an interface element configured to interact with a complementary interface element of the electrical unit, in order to bring about an electrical coupling via the interface elements of the mechanical unit to the electrical unit;
   wherein the electrical unit includes cooling fins projecting into a fluid stream—within—the mechanical unit generated by the movable conveying element of the mechanical unit in operation of the conveying device;
   wherein the cooling fins of the electrical unit project, through a recess formed in a housing of the mechanical unit, into the fluid stream—within—the mechanical unit generated by the movable conveying element of the mechanical unit in operation of the conveying device, such that the cooling fins are removed from the recess and the fluid stream when the electrical unit is detached from the mechanical unit, and,
   wherein the housing of the electrical unit is connected to the mechanical unit in a sealed manner so as to prevent moisture, dirt, or both from penetrating the electrical unit; and,
   wherein the complementary interface element of the electrical unit and the interface element of the mechanical unit are arranged such that an electrical connection is made by attaching the housing of the electrical unit to the mechanical unit, and the electrical connection is broken by detaching the housing of the electrical unit from the mechanical unit.

* * * * *